April 24, 1962  J. MEYERS  3,031,036
EMERGENCY BRAKE MECHANISM
Filed Dec. 3, 1956  3 Sheets-Sheet 1
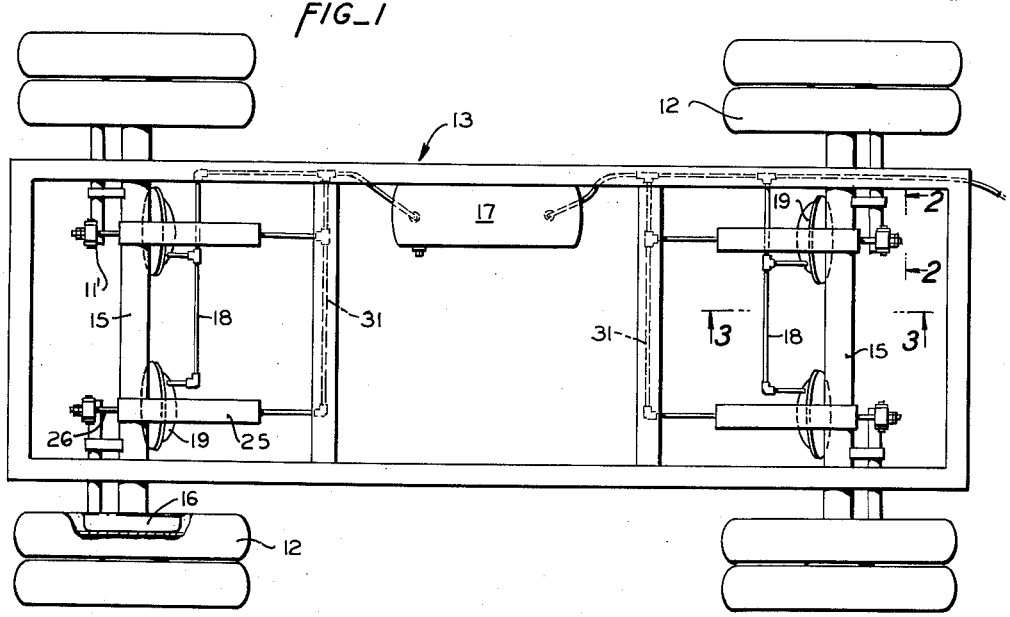
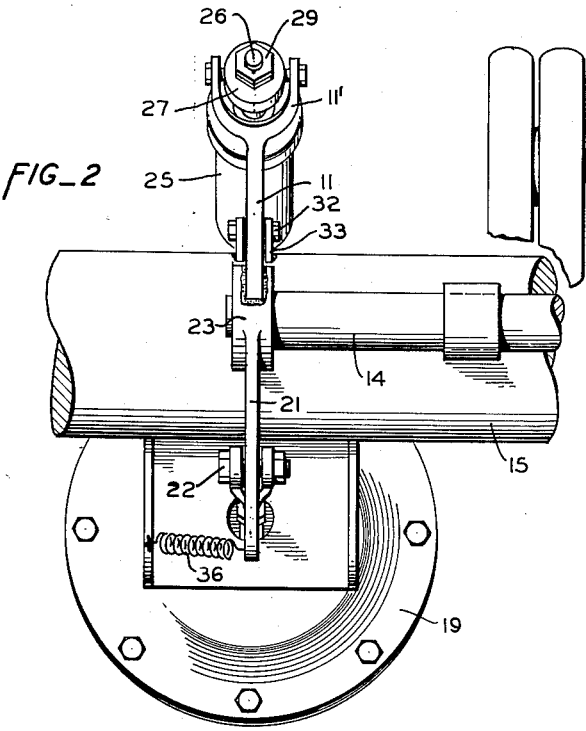
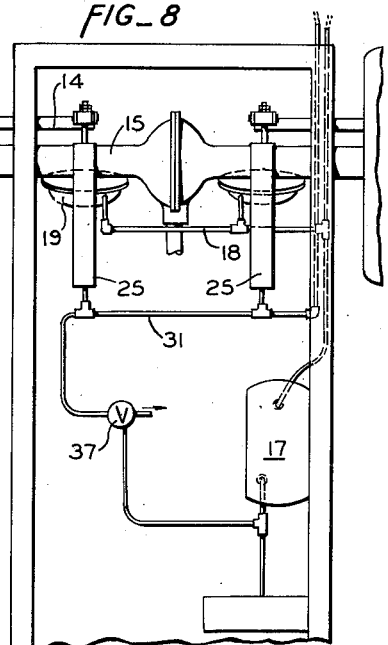
INVENTOR.
JOSEPH MEYERS
BY
Mellin and Hanscom
ATTORNEYS

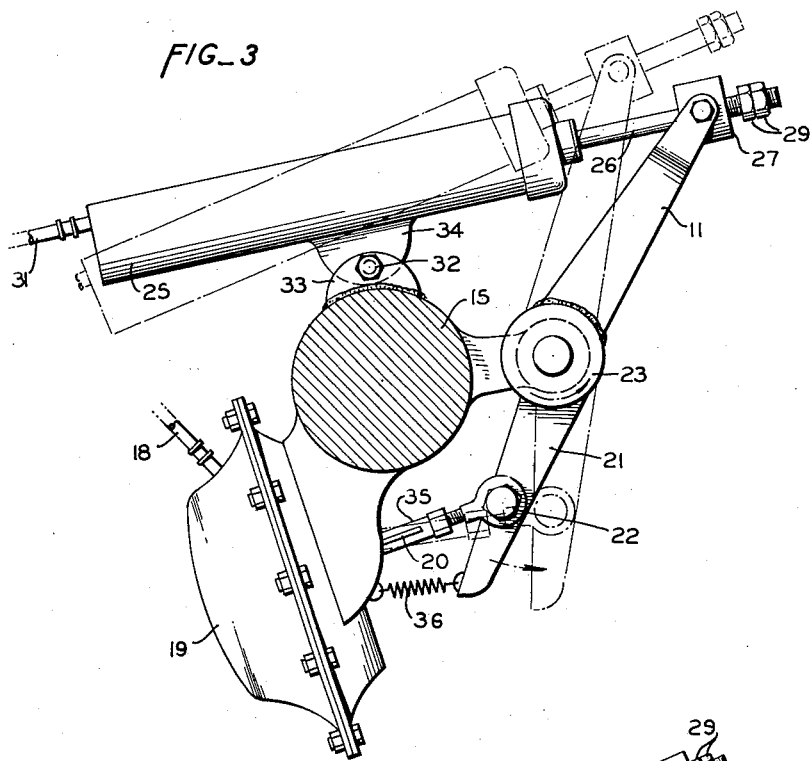
FIG_3
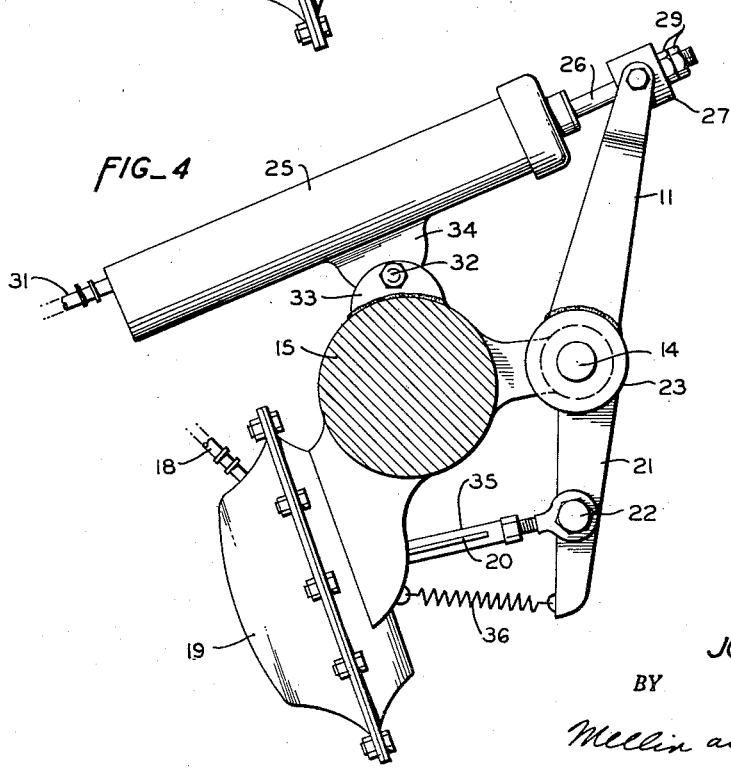
FIG_4
INVENTOR.
JOSEPH MEYERS
BY
Mellin and Hanscom
ATTORNEYS

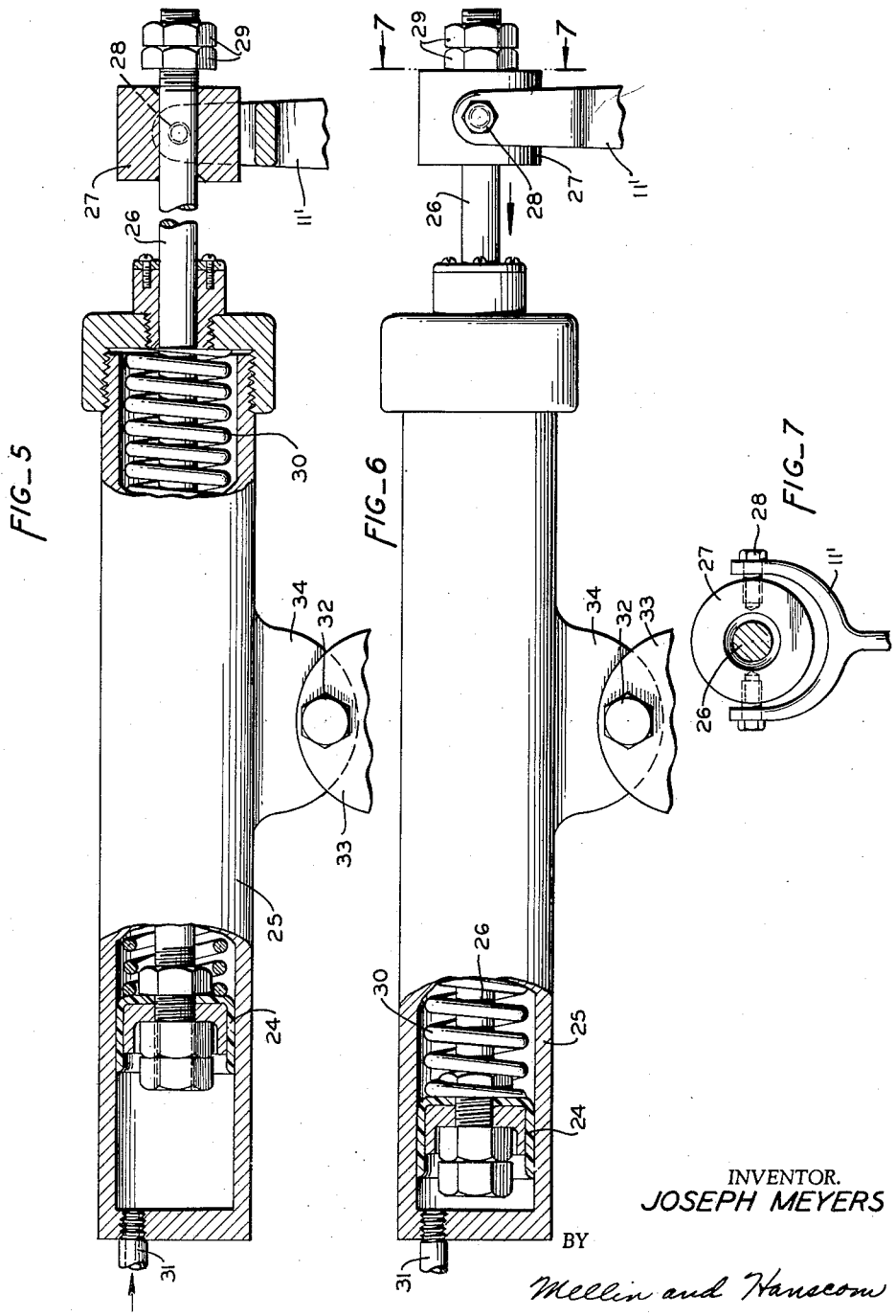

United States Patent Office 3,031,036
Patented Apr. 24, 1962

3,031,036
EMERGENCY BRAKE MECHANISM
Joseph Meyers, 23 Alter St., Cloverdale, Calif., assignor, by direct and mesne assignments, of one-third to Joseph Meyers, 23⅓ percent to John L. Miller, one-third to Swen G. Gammer, and one-tenth to Norman C. De Laittre, all of Cloverdale, Calif.
Filed Dec. 3, 1956, Ser. No. 625,741
7 Claims. (Cl. 188—106)

This invention relates to brake mechanism, and particularly to emergency braking mechanism for motor vehicles of the character of trucks and trailers.

The brakes of motor-operated trucks and trailers are commonly operated by air, or other fluid pressure, applied through camshafts and cams arranged to actuate brake shoes into braking engagement with brake drums associated with some or all of the wheels of the trucks, and of trailers connected thereto. The operation of the brakes is dependent upon the maintaining of an adequate pressure at the source of the fluid pressure. Failure of the fluid pressure supply may seriously impair, if not totally destroy, the operating efficiency of the brakes.

It is among the objects of this invention to provide brake-operating mechanism mounted in association with fluid pressure-operated service brakes of a vehicle to permit normal operation thereof without interference, and arranged to automatically apply spring-actuated emergency braking power in event of failure of the supply of fluid pressure.

It is also an object of the present invention to provide an emergency braking mechanism normally held in a brake-releasing position by the fluid pressure utilized for operating the service brakes of a truck and/or trailer, the mechanism being spring-actuated to braking position when the fluid pressure drops below a predetermined minimum.

A further object is to provide emergency brake mechanism which may be readily incorporated with fluid pressure-operated service brakes of conventional character as an attachment therefor, without altering the normal operation thereof, and which is responsive to a failure of the fluid pressure supply to apply the service brakes by spring-actuated emergency means.

A still further object is to provide an emergency brake mechanism which may be manually set to braking condition independently of the service braking mechanism, and without regard to the maintenance of the normal brake-operating fluid pressure supply.

Further objects include the provision of emergency braking mechanism embodying improved features of construction, arrangement, and mode of operation affording economy in manufacture and installation and high efficiency in operation.

These and other objects, some of which will be explained in the following specification, are accomplished by the device disclosed in the accompanying drawings forming a part of this specification. While only one embodiment of the invention has been selected for illustration in the drawings, the invention is not limited to the illustrated embodiment as the invention may be otherwise embodied within the scope of the appended claims.

In the drawings:

FIG. 1 is a plan view illustrating the manner in which emergency braking mechanism is mounted in association with the service braking mechanism of a trailer.

FIG. 2 is a front elevational view of one unit of the emergency braking mechanism as viewed upon the plane indicated by line 2—2 of FIG. 1, the figure being drawn on a larger scale.

FIG. 3 is a transverse sectional view taken upon the plane indicated by the line 3—3 of FIG. 1, the emergency braking mechanism being shown on a larger scale, in the normal inactive position.

FIG. 4 is a view similar to FIG. 3, showing the mechanism in brake-applying position.

FIG. 5 is a side elevational view, partly in longitudinal mid-section of a brake-operating cylinder made in accordance with the present invention, the parts being shown in brake-releasing position.

FIG. 6 is a view similar to FIG. 5, showing the parts in brake-applying position.

FIG. 7 is a transverse sectional view, the plane of the section being indicated by the line 7—7 of FIG. 6.

FIG. 8 is a plan view illustrating schematically the manner in which the emergency braking means may be controlled manually to function as parking brake means.

In terms of broad inclusion, the emergency brake mechanism of this invention comprises an emergency brake lever mounted in connection with the conventional fluid pressure-actuated service brake mechanism for each of a selected number of the wheels of a truck and/or trailer, said emergency brake mechanism being operable without altering the normal operation or the structure of the normal service brakes of the truck or trailer. A control cylinder is mounted in association with each brake lever, each cylinder being provided with a piston connected to the adjacent lever by a piston rod. A spring normally urges the piston in a brake-applying direction, the spring normally being compressed by fluid pressure supplied from the source utilized for normally operating the service brakes. The spring remains compressed, and the brake lever remains inactive in broke-releasing position, so long as the fluid pressure exceeds a predetermined minimum. In event of a failure of the fluid pressure supply, or upon manually controlled release thereof, the compressed springs automatically move the levers to apply the brakes.

In terms of greater detail, and referring particularly to the device as illustrated in the drawings, the emergency brake mechanism of the present invention comprises an emergency brake lever 11 mounted in association with the service brake mechanism for each of a desired number of the wheels 12 of a vehicle. As shown in FIG. 1 of the drawings, an emergency brake lever is mounted in association with each of the four wheels of a four wheel trailer chassis, designated in general by the numeral 13. Brake levers 11 may be similarly mounted in association with any or all of the wheels of a truck, and/or trailer of any other type attached thereto, in conventional manner.

As illustrated, each lever 11 is secured to the camshaft 14 mounted in connection with the axle housing 15 for each wheel assembly. Each shaft 14 is arranged to extend into a brake drum 16 carried by the adjacent wheel for operating brake shoes mounted therein, in conventional manner. Fluid pressure-actuated means is mounted in association with each shaft 14 for applying and releasing the brakes, as desired. Preferably, said means is of the type wherein fluid pressure from a supply tank 17 is directed through suitable hose connections 18 to a plunger chamber 19 or "pot" containing a diaphragm arranged to actuate a plunger stem 20. The structure and mode of operation of the plunger chamber and the diaphragm therein is well known, and requires no detailed explanation herein.

The plunger stems 20 can be pivotally connected to service brake lever arms 21 secured to the shafts 14 by suitable pivot pins 22 or can be connected thereto by a sliding connection 35 hereinafter described. Displacement of the stems 20 by fluid pressure directed thereon through the chambers 19 causes the levers 21 to oscillate the shafts 14 for applying and releasing the brakes in conventional manner.

The emergency brake mechanism of the present invention is mounted in association with the conventional service brake mechanism, as thus briefly described, to supplement ist action and to automatically apply the brakes in event the supply of fluid pressure fails. To that end, the emergency brake levers 11 are welded to hubs 23 by which the service brake levers 21 are mounted upon the shafts. The emergency brake levers 11 are disposed substantially diametrically opposite the service brake levers 21, and are movable therewith.

The emergency brake levers 11 are arranged to be actuated by means of pistons 24 mounted within cylinders 25, which, in turn, are pivotally mounted upon the axle housings 15 adjacent the plunger "pots" 19. Piston rods 26, secured at their inner ends to the pistons 24, extend axially outwardly from an end of each cylinder for attachment to the adjacent levers 11. Preferably, the levers 11 terminate in yoke arm portions 11', pivotally engaging a slide block 27 by means of trunnions 28 extending laterally from opposite sides thereof. A pair of lock nuts 29 is threaded onto the outer end of each piston rod 26 to limit movement of its slide block 27 outwardly therealong, and to transmit actuating force from the piston to the corresponding lever in a brake-applying direction.

A spring 30 is mounted within each cylinder 25 to normally urge the piston 24 and rod 26 thereof in a brake-applying direction. Fluid pressure from the supply tank 17 is directed through a suitable hose connection 31 into the cylinder for exerting pressure upon the piston in opposition to the pressure of the spring 30. While the fluid pressure supply is maintained at its normal operating pressure, the piston of each cylinder is moved to compress its spring 30 to store power for applying the brakes in case of emergency. So long as the fluid pressure supply is maintained at its normal operative pressure, the springs 30 of the several cylinders will remain compressed, and the piston rods 26 will be held in outwardly extending inactive position. The slide blocks 27 move freely along the rods as the levers 11 are moved between brake-releasing and brake-applying position in conformity with the operation of the service brake lever arms 21. The cylinders 25 are pivotally mounted upon pins 32 extending through perches 33 welded or otherwise secured to the adjacent axle housing 15, and lugs 34 extending laterally from the under sides of the cylinders. This pivotal mounting, coupled with the pivot movement of the yoke arm portions 11' upon the trunnions 28, permits free movement of the slide blocks 27 and levers 11 with the service brake levers 21, without resistance or interference by the cylinders 25 and mechanism mounted therein. The lock nuts 29 are adjusted to provide a seat for an adjacent slide block 27 when its lever 11 is in its extreme brake-releasing position.

The expansion of the brake drums, due to heat produced by prolonged application of the service brakes, sometimes prevents effective application of the brakes by normal operation. This condition, commonly referred to as brake "fading," is aggravated by wear upon the brake shoes. To insure effective application of the brakes in emergency, without limitation by the normal service brake operative mechanism, each service brake plunger rod 20 may be provided with a sliding connection 35 arranged to permit movement of the service brake lever arm 21 associated therewith beyond the normal displacement by the diaphragm within the "pot" 19. A tension spring 36 may be provided to hold the service brake lever in seated engagement with the plunger as it is retracted to release the brakes. When the emergency brake is applied, the sliding connection 35 permits the service brake lever arm to be moved beyond the limits of the diaphragm within the pot so as to insure maximum effectiveness of the emergency braking mechanism without limitation by the service braking mechanism, and without damage thereto.

In order to utilize the emergency braking mechanism as a parking brake mechanism, provision may be made for exhausting the fluid pressure from the cylinders 25 by manually controlled means. This may be accomplished by providing a suitable valve 37, manually operable to close the pressure supply to any or all of the cylinders, and to release the fluid pressure therein, so that the springs 30 may expand and apply the brakes. Such an arrangement, as applied to two of the brakes of a truck, is shown in FIG. 8. The emergency brake means for other wheels and brakes of a truck and/or trailer may be similarly controlled by one or more pressure release valves, as desired.

In operation, the pistons 24 are displaced by fluid pressure to compress the springs 30 to a point where the opposing pressures are equalized. In this position, the rods 26 project sufficiently from the cylinders to permit free movement of the levers 11, and the slide blocks to which they are pivoted, between the position of complete brake release shown in full lines in FIG. 3 and the point of maximum brake application shown in broken lines in FIG. 3. When now the service brakes are operated, as in normal driving along a highway, the emergency brake levers oscillate with the service brake levers without material restraint by the piston rods 26. This condition is maintained so long as the normal operating pressure of the fluid pressure supply is maintained, and the service brakes may be operated in the ordinary manner without loss of efficiency due to the presence of the auxiliary emergency brake mechanism.

In event of a failure of the fluid pressure supply, due to any cause whatsoever, the pressure directed to the the cylinders 30 for displacing the pistons 24 therein will immediately drop, and the springs 30 will expand to a corresponding degree within the cylinders, as indicated in FIG. 6. This expansion of the springs forces the pistons inwardly and force is applied by the lock nuts 29 against the slide blocks to move the emergency brake levers in a brake-applying direction. As a result, the brakes are immediately applied by movement of the levers 11, in the same manner as when they are applied by movement of the service levers 21. Since the springs are normally compressed to balance the full effective pressure of the fluid pressure supply, an equal amount of pressure is available to apply the emergency brakes. Thus, if a pressure supply line is broken, or, if for any other reason, the supply of fluid pressure is reduced below a predetermined minimum, the springs 30 immediately become effective to apply the service brakes in their ordinary manner to stop forward progress or to hold a parked vehicle against run-away movement. Because of the sliding connections 35, the movement of the emergency brake lever arms 11 may exceed the normal limit of the service brake arms 21, thus overcoming the effect of brake "fading" and insuring effective application of the brakes in event of emergency regardless of expansion of the brake drums and/or wear upon the brake shoes. The manual operation of the valve (or valves) 37 to release pressure from the cylinders 25 sets the brakes for purpose of parking.

Having thus described my invention, what I claim and desire to secure by Letters Patent is:

1. In an emergency brake system for wheeled vehicles having a chassis, an axle housing, a wheel equipped with a conventional service brake, said system being supported upon said chassis and including a camshaft rotatable for actuating said service brake in brake-applying and brake-releasing directions, fluid pressure actuated means having an actuated plunger that may be actuated in brake-applying and brake-releasing directions, means including a fluid pressure source for selectively applying pressure into said pressure actuated means, and the improvement comprising: means connecting said plunger and said camshaft for unitary movement upon actuation of said plunger in a brake-applying direction, said connecting means also providing a lost motion to allow rotation of said camshaft in a direction beyond the limits of brake-applying movement of said plunger, a brake lever secured to said camshaft, an auxiliary cylinder pivotally mounted to said axle housing and having a piston and piston rod, said piston rod extending outwardly toward said lever, means disposed at a constant distance from said camshaft slidably connecting said piston rod to said brake lever for unitary movement upon actuation of said piston rod in a brake-applying direction, said last named connecting means also providing a lost motion to allow rotation of said lever in a brake-applying direction free from piston rod movement, spring means disposed in said cylinder urging said piston rod in a brake-applying direction, and means transmitting fluid pressure into said cylinder and urging said piston rod in a brake-releasing direction, said piston rod being normally held in a brake-releasing position by said fluid pressure but actuated in a brake-applying direction by said spring means when the fluid pressure is below a predetermined minimum.

2. In a system as set forth in claim 1 wherein said actuated plunger, said means connecting said plunger to said camshaft, said cylinder and piston rod, said brake lever, and said means connecting said piston rod to said brake lever all have coplanar medial planes transverse to said camshaft.

3. In a system as set forth in claim 1 wherein the connecting means between said piston rod and said brake lever comprises a block slidably engaging said rod and pivotally connected to said lever, said rod being threaded and having a pair of lock nuts that may be adjustably positioned thereon for engaging said block as said rod is moved in a brake-applying direction.

4. In a brake system for wheeled vehicles having an axle receiving a wheel equipped with a conventional service brake, a camshaft rotatable in brake-applying and brake-releasing directions, a plunger stem movable between brake-applying and brake-releasing positions, a source of fluid pressure, fluid pressure actuated means responsive to said fluid for moving said stem to brake-applying position upon application of said fluid thereto, and means connecting said stem to said camshaft for unitary movement thereof; the improvement which comprises a lever secured to said camshaft, a cylinder pivotally mounted on said axle adjacent said lever, a piston slidably mounted within said cylinder, a piston rod attached to said piston and extending outwardly from an end of the cylinder toward said lever, means for directing fluid pressure into the opposite end of said cylinder from the source of fluid pressure, means slidably connecting the outer end of said piston rod to said lever at a constant distance from said camshaft, a spring within said cylinder normally urging the piston therein in a brake-applying direction, said spring imparting brake-applying motion to said camshaft when the pressure of said source is less than a predetermined minimum and said piston overcoming the force of said spring when said pressure is greater than said predetermined minimum; said plunger stem, means connecting said stem and camshaft, lever and cylinder, all having their medial plane lying substantially in a common plane transverse to the axis of said axle.

5. In a braking system for wheeled vehicles having a chassis including an axle housing and a wheel equipped with a conventional service brake, said system being supported upon said chassis and including a rotatable camshaft for actuating said service brake in brake-applying and brake-releasing directions, and the improvement comprising: a braking cylinder pivotally mounted on said axle housing and having a piston and piston rod, means disposed at a constant distance from said camshaft connecting said piston rod to said camshaft for unitary movement upon actuation of said piston rod in a brake-applying direction, said means including a block slidably engaging said piston rod and, pivotally connected to said camshaft and a stop means connected to said rod and adapted for engaging said block upon actuation of said piston rod in a brake-applying direction, spring means disposed in said cylinder urging said piston rod in a brake-applying direction, and means transmitting fluid pressure into said cylinder and urging said piston rod in a brake-releasing direction, said piston rod being normally held in a brake-releasing position by said fluid pressure but actuated in a brake-applying direction by said spring means when said fluid pressure is below a predetermined minimum.

6. In a system as set forth in claim 5 wherein the piston rod is threaded and provided with a pair of lock nuts as said stop means, said lock nuts being adjustably positioned for engaging said block as said rod is moved in a brake-applying direction.

7. In a system as set forth in claim 5 wherein said cylinder, said piston rod, and said block all have coplanar medial planes transverse to said camshaft.

References Cited in the file of this patent

UNITED STATES PATENTS

| | | |
|---|---|---|
| 1,997,807 | Bird | Apr. 16, 1935 |
| 2,065,259 | Ball et al. | Dec. 22, 1936 |
| 2,211,025 | Parkes | Aug. 13, 1940 |
| 2,409,908 | Simpkins | Oct. 22, 1946 |
| 2,619,201 | Crookston | Nov. 25, 1952 |
| 2,631,266 | Britt | Mar. 10, 1953 |
| 2,645,313 | Schaadt | July 14, 1953 |
| 2,738,037 | Balcerek et al. | Mar. 13, 1956 |
| 2,845,148 | Sturgill | July 29, 1958 |
| 2,905,273 | Kohler | Sept. 22, 1959 |
| 2,934,380 | Julier et al. | Apr. 26, 1960 |

FOREIGN PATENTS

| | | |
|---|---|---|
| 490,669 | Great Britain | Aug. 15, 1938 |